United States Patent [19]
Iwasaki

[11] Patent Number: 5,138,493
[45] Date of Patent: Aug. 11, 1992

[54] ZOOM LENS SYSTEM

[75] Inventor: Satoshi Iwasaki, Toyokawa, Japan

[73] Assignee: Minolta Camera Co., Ltd., Osaka, Japan

[21] Appl. No.: 666,333

[22] Filed: Mar. 7, 1991

[30] Foreign Application Priority Data

Mar. 7, 1990 [JP] Japan .................................. 2-57500

[51] Int. Cl.$^5$ ............................................ G02B 15/14
[52] U.S. Cl. ..................................... 359/689; 359/679
[58] Field of Search ............. 350/423; 359/676, 679, 359/689

[56] References Cited

U.S. PATENT DOCUMENTS 4,733,951  5/1988  Pareigat ........................... 359/691

FOREIGN PATENT DOCUMENTS 0184916 10/1983  Japan ................................. 350/423

Primary Examiner—Bruce Y. Arnold
Assistant Examiner—David R. Parsons
Attorney, Agent, or Firm—Price, Gess & Ubell

[57] ABSTRACT

A zoom lens system including, from an enlargement side, a first lens unit of a positive power, a second lens unit of a positive power and a third lens unit of a negative power. The first and third lens units monotonously move toward a reduction side during a zooming operation from the longest focal length condition to the shortest focal length condition, while the second lens unit which is closest to the third lens unit at the longest focal condition moves so as to be most proximate to the first lens unit at the shortest focal length condition. The zoom lens system fulfills the following conditions, $$3 \leq f_L/|f_{III}| \leq 6$$

$$2 \leq f_L/f_I \leq 5$$

wherein $f_L$ is the focal length of the zoom lens system at the longest focal length condition, $f_{III}$ is the focal length of the third lens unit, and $f_I$ is the focal length of the first lens unit.

9 Claims, 6 Drawing Sheets

ZOOM LENS SYSTEM

BACKGROUND OF THE INVENTION

1. Field of the Invention

The present invention relates to zoom lens systems, and more particularly to zoom lens systems for use in an optical apparatus, such as microfilm projectors, having a finite conjugate distance.

2. Description of the Related Art

Microfilms are prepared often with images recorded thereon that are positioned vertically or horizontally at random. It is therefore likely that some images are projected as inclined at an angle of 90 degrees. Accordingly, microfilm readers or reader-printers are usually provided with an image rotation prism between the projection lens and the screen, i.e., on the enlargement side of the lens, whereby the image to be projected is suitably rotated for the correction of its position.

With an arrangement wherein the image rotation prism is disposed on the enlargement side of the projection lens, the projection lens must be short in its overall length in view of the space needed for providing the lens.

This requirement is a great limitation to projection lenses of long focal length with a magnification of about X10. The requirement imposes a still greater limitation on zoom lens systems including a magnification of about X10 within the zooming range.

U S. Pat. No. 4,733,951 discloses a zoom lens system which is provided with an image rotation prism similarly on the enlargement side. The disclosed zoom lens system has a zooming range of X6.5 to X14 and is of the type comprising two groups of lenses, i.e., a first lens group having a positive power, and a second lens group having a negative power. The zoom lens system has a telephoto ratio ($\infty TL_L/f_L$) of 0.78 when set to the longest focal length with the object point at infinity.

SUMMARY OF THE INVENTION

Accordingly, the main object of the present invention is to provide a compact zoom lens having a telephoto ratio ($\infty TL_L/f_L$) of 0.73 to 0.75.

Another object of the invention is to provide a zoom lens system with aberrations corrected satisfactorily.

Another object of the invention is to provide a zoom lens system wherein the pupil position on the reduction side is away from the image surface on the reduction side.

Another object of the invention is to provide a zoom lens system which can be zoomed with diminished variations in the pupil position on the reduction side.

Still another object of the invention is to provide a zoom lens system having a zooming range of about X7 to about X10 in magnification.

BRIEF DESCRIPTION OF THE DRAWINGS

These and other objects or features of the present invention will become more apparent from the following description of preferred embodiments thereof taken in conjunction with the accompanying drawings, in which:

FIGS. 1 (A) and (B) are diagrams showing the lens construction of a zoom lens system according to a first embodiment of the invention as set to the longest focal length and to the shortest focal length, respectively;

FIGS. 2 (A), (B) and (C) are aberration curve diagrams of the zoom lens system of FIG. 1 as set to the longest focal length, an intermediate focal length and the shortest focal length, respectively;

FIGS. 3 (A) and (B) are diagrams showing the lens construction of a zoom lens system according to a second embodiment of the invention as set to the longest focal length and the shortest focal length, respectively;

FIGS. 4 (A), (B) and (C) are aberration curve diagrams of the zoom lens system of FIG. 3 as set to the longest focal length, an intermediate focal length and the shortest focal length, respectively;

FIGS. 5 (A) and (B) are diagrams showing the lens construction of a zoom lens system according to a third embodiment of the invention as set to the longest focal length and the shortest focal length, respectively; and FIGS. 6 (A), (B) and (C) are aberration curve diagrams of the zoom lens system of FIG. 5 as set to the longest focal length, an intermediate focal length and the shortest focal length, respectively.

In the following description, like parts are designated by like reference numbers throughout the several drawings.

DESCRIPTION OF THE PREFERRED EMBODIMENTS

First to third embodiments of the invention will be described below with reference to the drawings.

The first to third embodiments will be described first with respect to the lens construction of each. The lens construction of the first embodiment shown in FIGS. 1 (A) and (B), that of the second embodiment in FIGS. 3 (A) and (B), and that of the third embodiment in FIGS. 5 (A) and (B). Each FIG. (A) of these drawings shows the lens system as set to the longest focal length, and each FIG. (B) thereof shows the same as set to the shortest focal length.

Figure 1A:
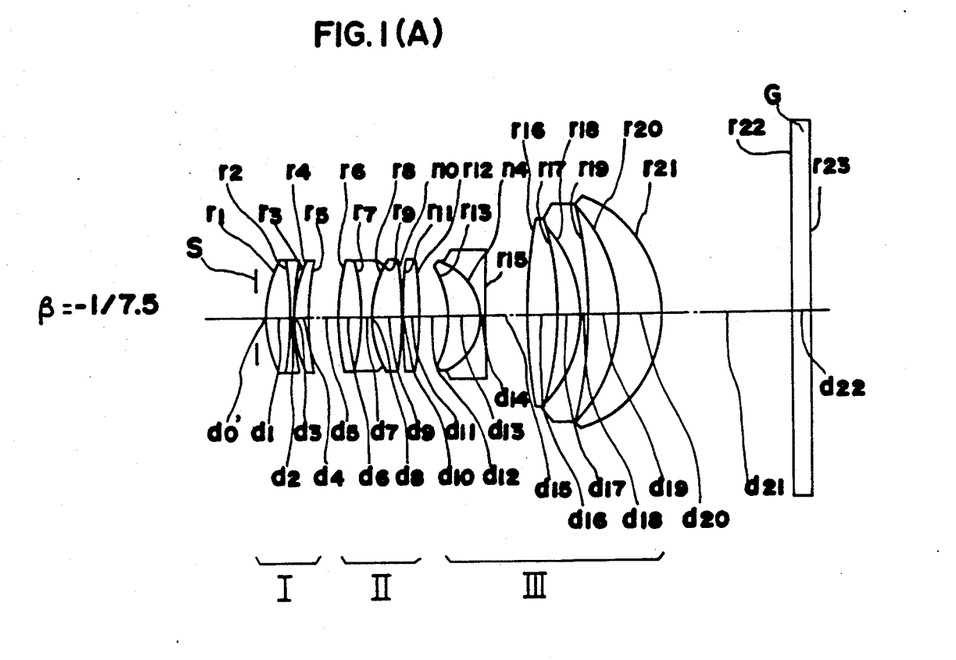
Figure 1B:
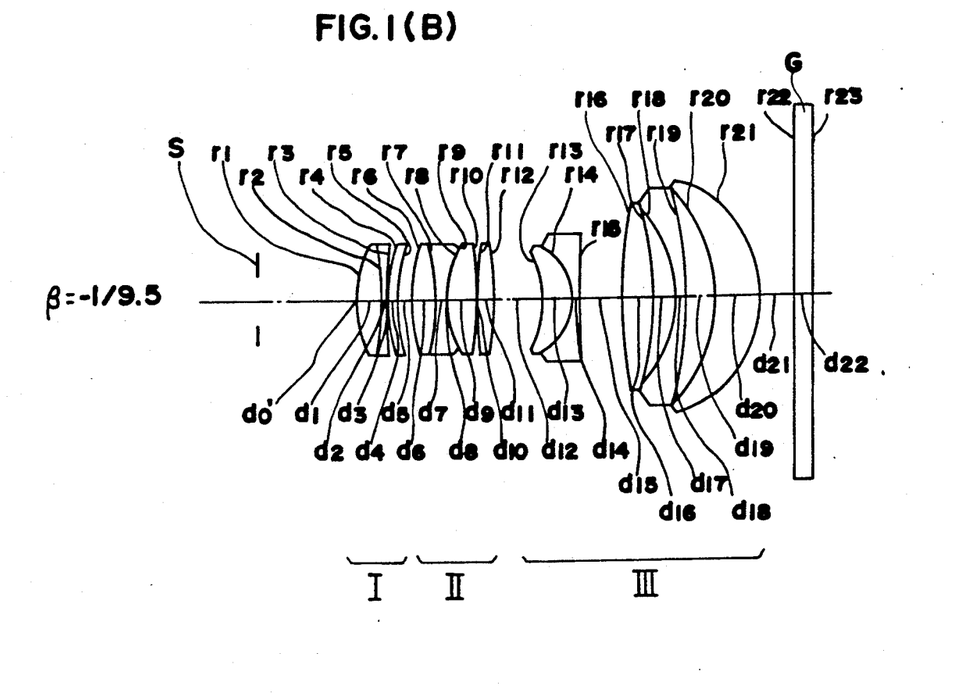

With reference to FIGS. 1 (A) and (B), the lens system of the first embodiment comprises, as arranged rightward from the enlargement side at left, a stop S; a first lens unit I having a positive refractive power and comprising a compound lens composed of a positive first lens Gl and a negative second lens G2, and a positive meniscus third lens G3 with a convex surface facing the enlargement side; a second lens unit II having a positive refractive power and comprising a compound lens composed of a positive fourth lens G4 and a biconcave fifth lens G5, a biconvex sixth lens G6 and a positive seventh lens G7; and a third lens unit III having a negative refractive power and comprising a compound lens composed of a positive meniscus eighth lens G8 with a concave surface facing the enlargement side and a negative ninth lens G9, a biconvex tenth lens G10, a negative meniscus eleventh lens G11 with a concave surface facing the enlargement side, and a positive meniscus twelfth lens G12 with a concave surface facing the enlargement side. A plane glass plate G on the right-hand side serves to hold a microfilm along with another plane glass plate which is not shown.

Figure 3A:
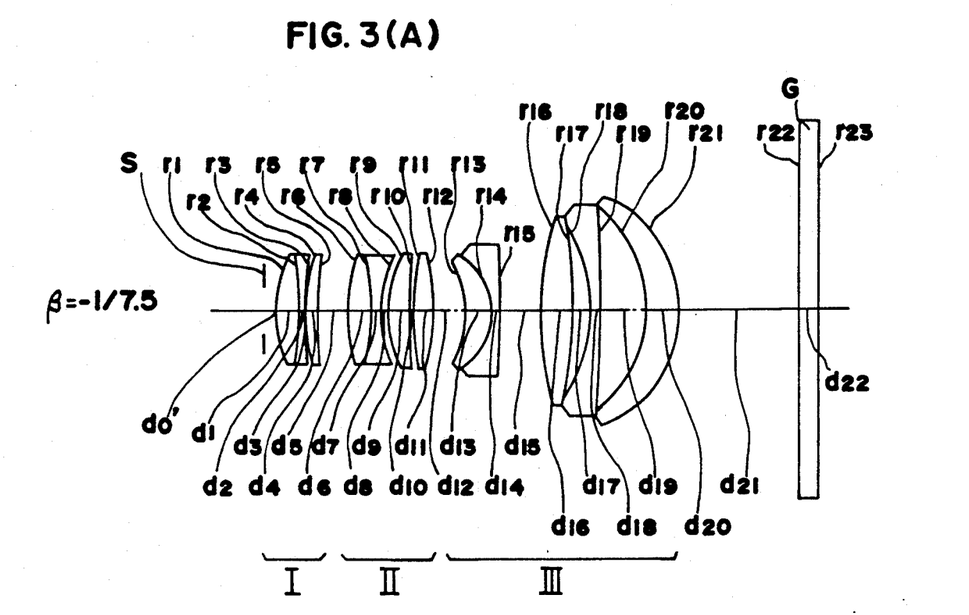
Figure 3B:
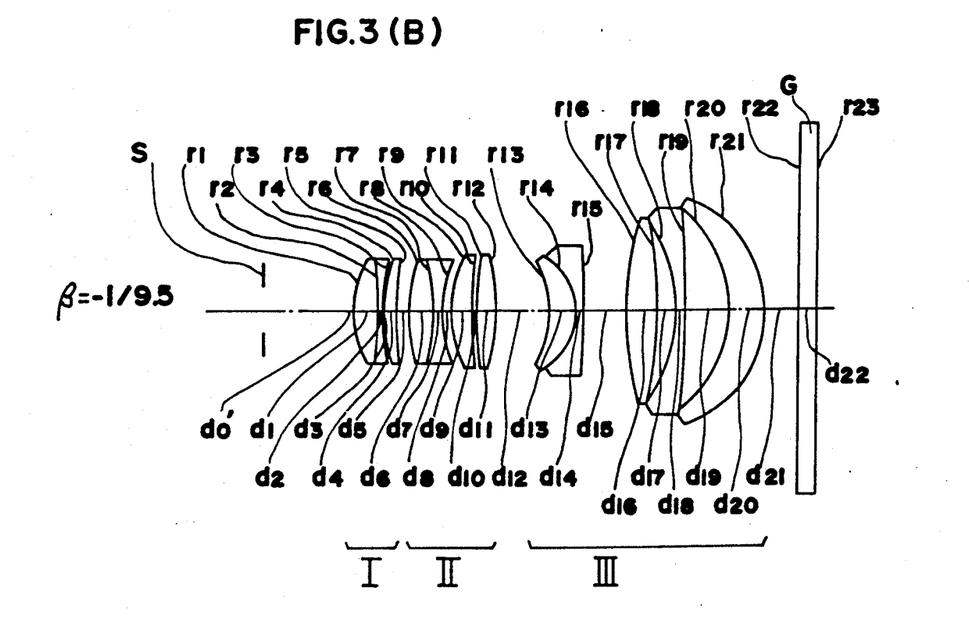

With reference to FIGS. 3 (A) and (B), the lens system of the second embodiment comprises, as arranged from the enlargement side at left toward the other side, a stop S; a first lens unit I having a positive refractive power and comprising a compound lens composed of a positive first lens Gl and a negative second lens G2, and a positive meniscus third lens G3 with a convex surface facing the enlargement side; a second lens unit II having a positive refractive power and comprising a compound lens composed of a positive fourth lens G4 and a biconcave fifth lens G5, a positive sixth lens G6 with a convex surface facing the enlargement side, and a positive seventh lens G7; and a third lens unit III having a negative refractive power and comprising a compound lens composed of a positive meniscus eighth lens G8 with a concave surface facing the enlargement side and a negative ninth lens G9, a biconvex tenth lens G10, a negative meniscus eleventh lens G11 with a concave surface facing the enlargement side, and a positive meniscus twelfth lens G12 with a concave surface facing the enlargement side.

Figure 5A:
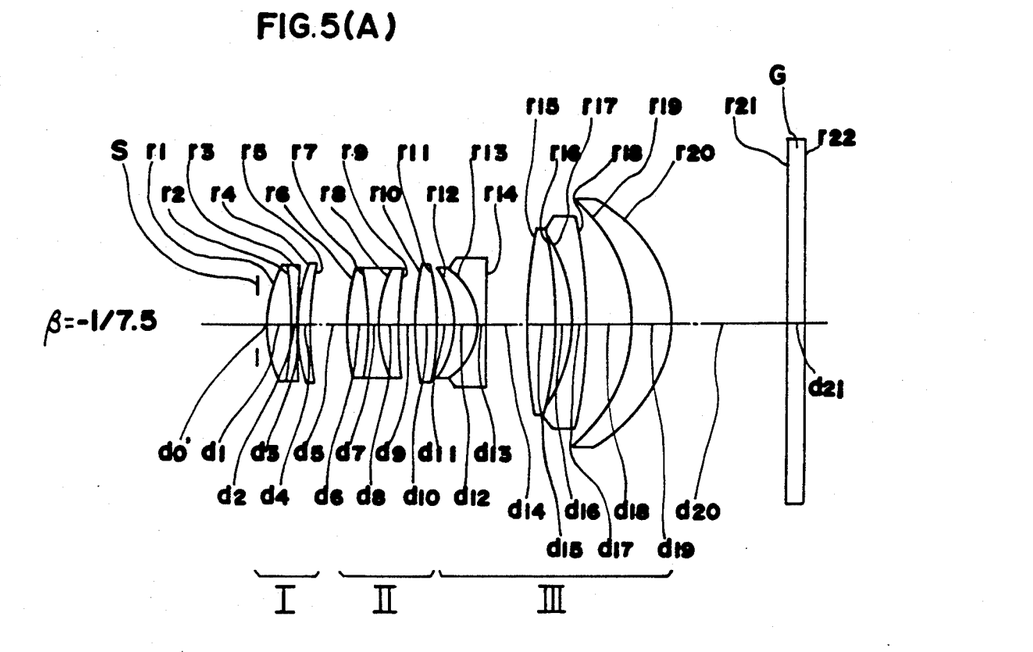
Figure 5B:
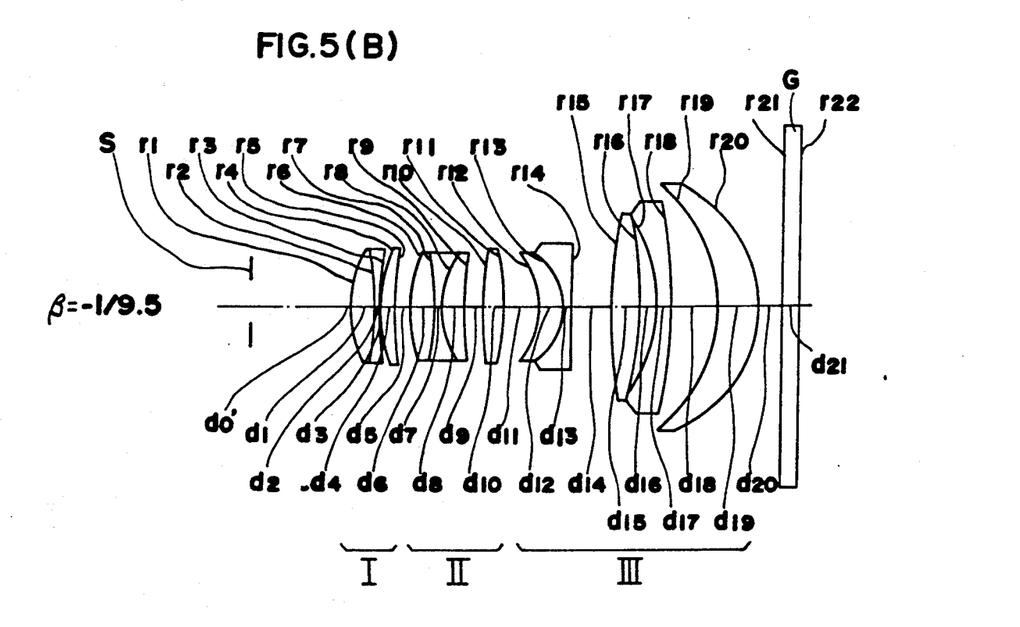

Further as shown in FIGS. 5 (A) and (B), the lens system of the third embodiment comprises, as arranged from the enlargement side at left toward the other side, a stop S; a first lens unit I having a positive refractive power and comprising a compound lens composed of a positive first lens G1 and a negative second lens G2, and a positive meniscus third lens G3 with a convex surface facing the enlargement side; a second lens unit II having a positive refractive power and comprising a compound lens composed of a positive fourth lens G4 and a biconcave fifth lens G5, a positive sixth lens G6 joined to the fifth lens G5, and a biconvex seventh lens G7; and a third lens unit III having a negative refractive power and comprising a compound lens composed of a positive meniscus eighth lens G8 with a concave surface facing the enlargement side and a negative ninth lens G9, a biconvex tenth lens G10, a negative meniscus eleventh lens G11 with a concave surface facing the enlargement side, and a positive meniscus twelfth lens G12 with a concave surface facing the enlargement side.

The embodiments will be described next with respect to the movement of the lens units. The embodiments are similar in the movement of the lens units.

First, when the lens system as set to the longest focal length as shown in each of FIGS. 1, 3 and 5 (A) is zoomed to the position of the shortest focal length shown in each of FIGS. 1, 3 and 5 (B), the first lens unit I and the third lens unit III monotonously move toward the reduction side, and the second lens unit II also similarly moves toward the reduction side. However, the second unit II moves by a smaller amount than the first and third unit I and III. Furthermore, the second lens unit II is closest to the third lens unit III when positioned for the longest focal length and so moves to the position of the shortest focal length as to be most proximate to the first lens unit I.

Further each zoom lens system is so constructed that the second lens unit II and the third lens unit III each produce a zooming effect, and fulfills the requirement of:

$$3 \leq f_L/|f_m| \leq 6 \tag{1}$$

wherein $f_L$ is the focal length of the entire system as set to the longest focal length, and fm is the focal length of the third lens unit III. When satisfied, this requirement assures efficient zooming with reduced amounts of movement.

If the upper limit of the expression (1) is exceeded, the refractive power of the third lens unit III increases in the negative direction, permitting the third lens unit III to produce increased curvature of field, which in turn becomes difficult to correct by the other lens units. Alternatively if the lower limit of the expression (1) is exceeded, the refractive power of the third lens unit III decreases in the negative direction, necessitating a larger amount of movement of the third lens unit III when giving the same zooming ratio. Furthermore, the lens system then becomes greater in its entire length and less compact.

Additionally, each of the zoom lens systems satisfies the requirement of:

$$2 \leq f_L/f_I \leq 5 \tag{2}$$

wherein $f_I$ is the focal length of the first lens unit I. When meeting both the requirement (2) and the foregoing requirement (1), the lens system is serviceable in its entirety as a telephoto lens system having a strong positive refractive power on the enlargement side and can be shortened in its overall length and compacted.

If the upper limit of the above expression (2) is exceeded, the first lens unit I exhibits an increased refractive power and produces negative spherical aberration which is difficult to correct by the other lens units. Alternatively if the lower limit of the expression (2) is exceeded, the refractive power of the first lens unit I decreases, giving an increased overall length to the lens system and rendering the system less compact.

When the third lens unit III is given a relatively great negative refractive power as represented by the expression (1), relatively great field curvature will result. Accordingly, the positive lens is incorporated in the third lens unit III of the negative refractive power at a portion thereof most proximate to the reduction side, whereby the field curvature can be corrected, with the pupil position on the reduction side made relatively remote from the image surface on the reduction side. The positive lens is preferably a positive meniscus lens with a concave surface facing the enlargement side. When so shaped, the lens is advantageous to the correction of coma.

Further to set the pupil position on the reduction side remote from the image surface on the reduction side, it is desired for the lens system to meet the requirement of:

$$0.2 < D_m/f_L \tag{3}$$

wherein Dm is the overall thickness of the third lens unit III, and to position the positive meniscus lens sufficiently rearward. Incidentally, if the lower limit of the expression (3) is exceeded, the pupil position on the reduction side becomes too close to the image surface on the reduction side, consequently making the illumination system very large.

Furthermore, the aperture stop S is fixedly provided in the vicinity of the end of the zoom lens system toward the enlargement end. This decreases the width of bundle of rays at this end to eliminate variations in the width of bundle of rays when the system is zoomed as desired so as to render a small image rotation prism usable for the zoom lens system.

Listed in Tables 1 to 3 below are the detailed specifications of the zoom lens systems of the first to third embodiments, i.e., the radii of curvatures of the lens surfaces, axial distances, and refractive indexes and Abbe numbers of glass materials. The tables also show the numerical values required of the embodiments according to the expressions.

In the tables, f stands for the focal length, Feff. for the effective f-number, Ext. P. for the pupil position on the reduction side based on the conjugate surface on the reduction side, and $\infty TL_L/f_L$ for the telephoto ratio of the system as set to the longest focal length with the object point at infinity.

Figure 2A:
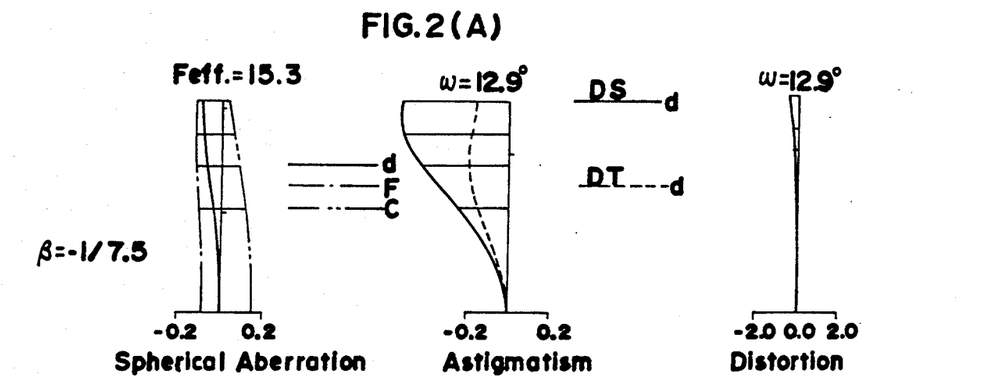
Figure 2B:
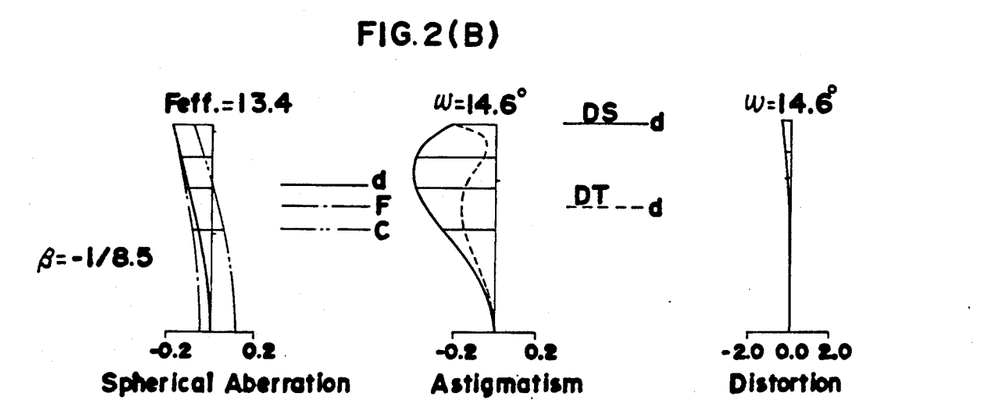
Figure 2C:
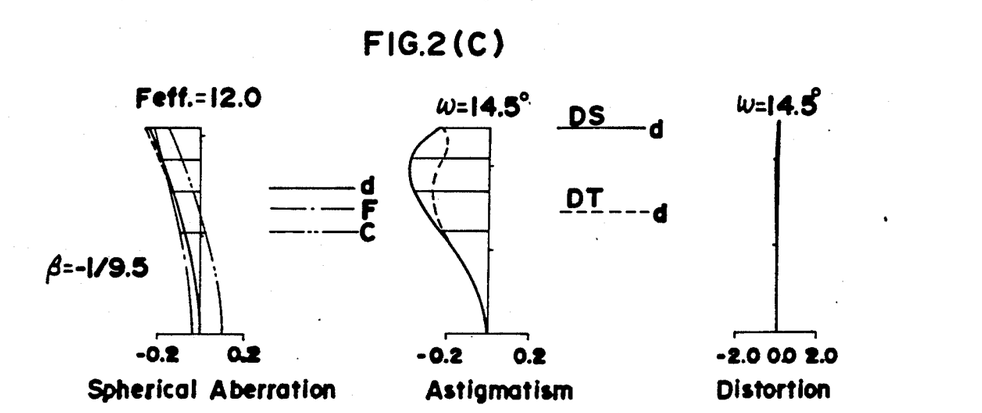
Figure 4A:
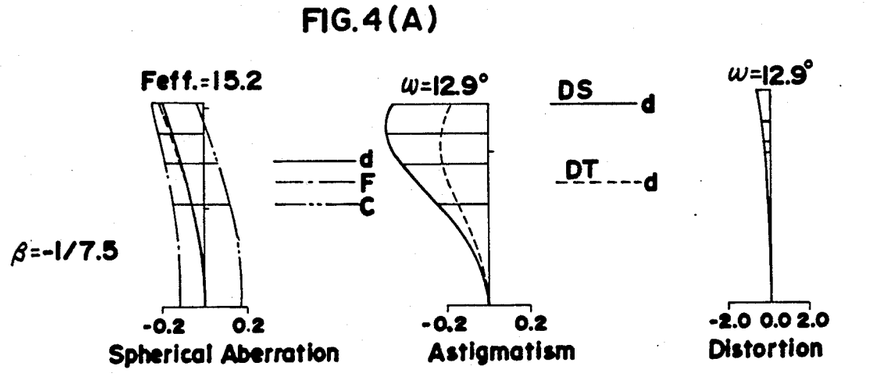
Figure 4B:
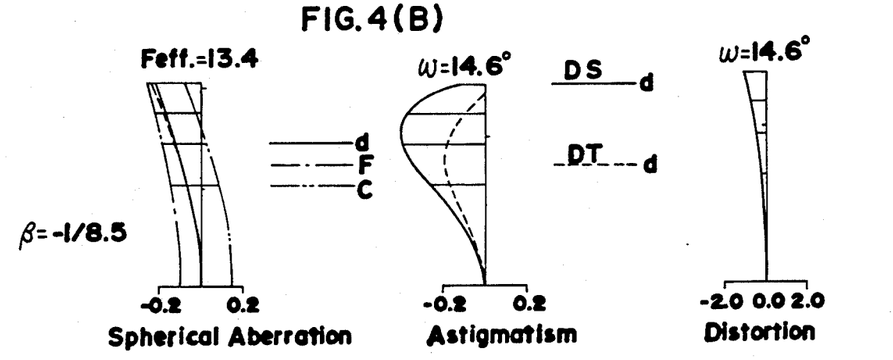
Figure 4C:
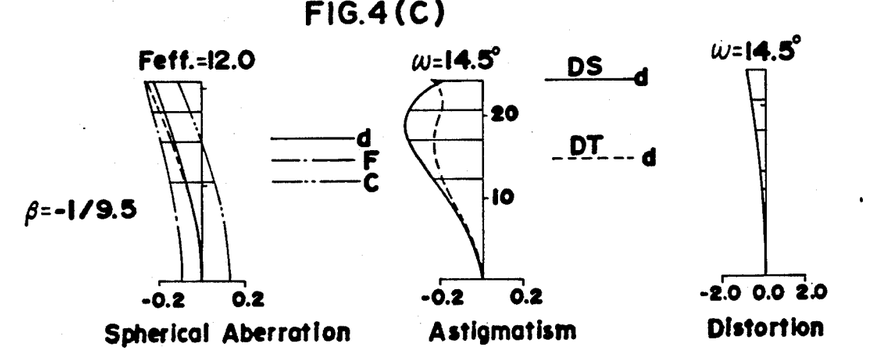
Figure 6:
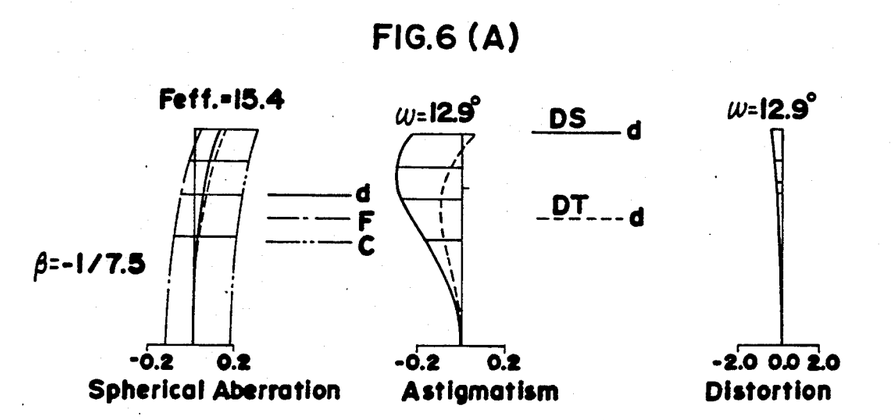

FIGS. 2, 4 and 6 show aberration curve diagrams of the lens systems of first to third embodiments, respectively. The aberration curve diagrams at the longest focal length position are shown in FIGS. (A), those at an intermediate focal length position in FIGS. (B), and those at the shortest focal length position in FIGS. (C).

TABLE 1 f/Feff. = 103.3/15.3—93.9/13.4—86.0/12.0
β = −1/7.5——1/8.5——1/9.5
Ext. P. = −74——68——64

| | | | Radius of curvature | | Axial distance | Refractive index (Nd) | | Abbe number (νd) |
|---|---|---|---|---|---|---|---|---|
| | | S | (aperture stop) | | | | | |
| | | | | d0 | 1.00—9.24—15.86 | | | |
| I | G1 | r1 | 17.64 | d1 | 4.12 | N1 | 1.5145 | ν1 | 54.6 |
| | G2 | r2 | −109.50 | d2 | 1.00 | N2 | 1.8500 | ν2 | 40.0 |
| | | r3 | 65.54 | d3 | 0.15 | | | |
| | G3 | r4 | 23.90 | d4 | 1.96 | N3 | 1.6400 | ν3 | 60.1 |
| | | r5 | 41.20 | d5 | 4.69—3.22—1.96 | | | |
| II | G4 | r6 | 30.01 | d6 | 4.22 | N4 | 1.5174 | ν4 | 52.2 |
| | G5 | r7 | −33.69 | d7 | 1.00 | N5 | 1.8500 | ν5 | 40.0 |
| | | r8 | 15.23 | d8 | 0.26 | | | |
| | G6 | r9 | 15.36 | d9 | 5.20 | N6 | 1.4875 | ν6 | 70.4 |
| | | r10 | −96.82 | d10 | 0.20 | | | |
| | G7 | r11 | 138.63 | d11 | 2.90 | N7 | 1.7847 | ν7 | 26.1 |
| | | r12 | −60.81 | d12 | 4.67—6.40—7.96 | | | |
| III | G8 | r13 | −17.44 | d13 | 5.07 | N8 | 1.6477 | ν8 | 33.8 |
| | G9 | r14 | −9.40 | d14 | 1.00 | N9 | 1.8500 | ν9 | 40.0 |
| | | r15 | 7063.14 | d15 | 6.68 | | | |
| | G10 | r16 | 81.44 | d16 | 5.05 | N10 | 1.8052 | ν10 | 25.5 |
| | | r17 | −55.47 | d17 | 3.88 | | | |
| | G11 | r18 | −21.61 | d18 | 1.50 | N11 | 1.8500 | ν11 | 40.0 |
| | | r19 | −67.54 | d19 | 4.58 | | | |
| | G12 | r20 | −25.65 | d20 | 7.38 | N12 | 1.5182 | ν12 | 59.0 |
| | | r21 | −20.42 | d21 | 20.41—11.92—4.99 | | | |
| | G | r22 | ∞ | d22 | 3.00 | N13 | 1.5168 | ν13 | 64.2 |
| | | r23 | ∞ | | | | | |

∞TL$_L$/f$_L$ = 0.74    f$_L$/f$_I$ = 2.63
f$_L$/|fm| = 4.43    Dm/f$_L$ = 0.34

TABLE 2 f/Feff. = 102.0/15.2—92.8/13.4—85.1/12.0
β = −1/7.5——1/8.5——1/9.5
Ext. P. = −69——63——59

| | | | Radius of curvature | | Axial distance | Refractive index (Nd) | | Abbe number (νd) |
|---|---|---|---|---|---|---|---|---|
| | | S | (aperature stop) | | | | | |
| I | G1 | r1 | 17.49 | d1 | 4.09 | N1 | 1.5176 | ν1 | 53.5 |
| | G2 | r2 | −66.09 | d2 | 1.00 | N2 | 1.8500 | ν2 | 40.0 |
| | | r3 | 61.19 | d3 | 0.15 | | | |
| | G3 | r4 | 28.90 | d4 | 1.96 | N3 | 1.6405 | ν3 | 60.1 |
| | | r5 | 81.34 | d5 | 4.73—3.25—1.95 | | | |
| | | r6 | 30.00 | | | | | |

TABLE 2-continued f/Feff. = 102.0/15.2—92.8/13.4—85.1/12.0
β = −1/7.5——1/8.5——1/9.5
Ext. P. = −69——−63——−59

| | | | Radius of curvature | | Axial distance | | Refractive index (Nd) | | Abbe number (νd) |
|---|---|---|---|---|---|---|---|---|---|
| | | | | d6 | 4.22 | N4 | 1.5407 | ν4 | 47.2 |
| | G4 | r7 | −30.00 | | | | | | |
| | | | | d7 | 1.00 | N5 | 1.8500 | ν5 | 40.0 |
| | G5 | r8 | 16.25 | | | | | | |
| | | | | d8 | 1.54 | | | | |
| II | | r9 | 18.80 | | | | | | |
| | G6 | | | d9 | 3.64 | N6 | 1.4875 | ν6 | 70.4 |
| | | r10 | 103.44 | | | | | | |
| | | | | d10 | 0.82 | | | | |
| | | r11 | 72.41 | | | | | | |
| | G7 | | | d11 | 3.18 | N7 | 1.6200 | ν7 | 36.3 |
| | | r12 | −32.40 | | | | | | |
| | | | | d12 | 5.30—7.13—8.79 | | | | |
| | | r13 | −18.17 | | | | | | |
| | G8 | | | d13 | 4.44 | N8 | 1.6200 | ν8 | 36.3 |
| | | r14 | −10.79 | | | | | | |
| | G9 | | | d14 | 1.00 | N9 | 1.8500 | ν9 | 40.0 |
| | | r15 | −260.56 | | | | | | |
| | | | | d15 | 7.10 | | | | |
| | | r16 | 60.84 | | | | | | |
| III | G10 | | | d16 | 5.29 | N10 | 1.8052 | ν10 | 25.4 |
| | | r17 | −60.84 | | | | | | |
| | | | | d17 | 2.71 | | | | |
| | | r18 | −26.57 | | | | | | |
| | G11 | | | d18 | 1.50 | N11 | 1.8500 | ν11 | 40.0 |
| | | r19 | −255.26 | | | | | | |
| | | | | d19 | 7.53 | | | | |
| | | r20 | −21.24 | | | | | | |
| | G12 | | | d20 | 5.60 | N12 | 1.5182 | ν12 | 59.0 |
| | | r21 | −19.86 | | | | | | |
| | | | | d21 | 19.14—11.43—5.14 | | | | |
| | | r22 | ∞ | | | | | | |
| | G | | | d22 | 3.00 | N13 | 1.5168 | ν13 | 64.2 |
| | | r23 | ∞ | | | | | | |

∝TL$_L$/f$_L$ = 0.75     f$_L$/f$_I$ = 2.61
f$_L$/|fm| = 4.59     Dm/f$_L$ = 0.34

TABLE 3 f/Feff. = 104.7/15.4—94.9/13.5—87.1/12.1
β = −1/7.5——1/8.5——1/9.5
Ext. P. = −78——−73——−69

| | | | Radius of curvature | | Axial distance | | Refractive index (Nd) | | Abbe number (νd) |
|---|---|---|---|---|---|---|---|---|---|
| | | S | (aperature stop) | | | | | | |
| | | | | d0 | 1.00—9.39—15.98 | | | | |
| | G1 | r1 | 18.37 | | | | | | |
| | | | | d1 | 4.10 | N1 | 1.5176 | ν1 | 53.5 |
| | | r2 | −97.62 | | | | | | |
| I | G2 | | | d2 | 1.10 | N2 | 1.8500 | ν2 | 40.0 |
| | | r3 | 60.84 | | | | | | |
| | | | | d3 | 0.15 | | | | |
| | | r4 | 25.51 | | | | | | |
| | G3 | | | d4 | 2.20 | N3 | 1.6405 | ν3 | 60.1 |
| | | r5 | 55.42 | | | | | | |
| | | | | d5 | 5.70—4.02—2.53 | | | | |
| | | r6 | 26.60 | | | | | | |
| | G4 | | | d6 | 4.00 | N4 | 1.5174 | ν4 | 52.2 |
| | | r7 | −43.02 | | | | | | |
| | G5 | | | d7 | 1.20 | N5 | 1.8500 | ν5 | 40.0 |
| | | r8 | 14.66 | | | | | | |
| II | G6 | | | d8 | 3.80 | N6 | 1.4875 | ν6 | 70.4 |
| | | r9 | 76.29 | | | | | | |
| | | | | d9 | 2.80 | | | | |
| | | r10 | 51.51 | | | | | | |
| | G7 | | | d10 | 3.80 | N7 | 1.6889 | ν7 | 31.2 |
| | | r11 | −39.05 | | | | | | |
| | | | | d11 | 2.60—4.28—5.77 | | | | |
| | | r12 | −15.56 | | | | | | |
| | G8 | | | d12 | 4.00 | N8 | 1.5927 | ν8 | 35.3 |
| | | r13 | −10.68 | | | | | | |
| | G9 | | | d13 | 1.30 | N9 | 1.8500 | ν9 | 40.0 |
| | | r14 | −3320.49 | | | | | | |
| | | | | d14 | 6.50 | | | | |
| | | r15 | 85.54 | | | | | | |

TABLE 3-continued f/Feff. = 104.7/15.4—94.9/13.5—87.1/12.1
$\beta$ = −1/7.5——1/8.5——1/9.5
Ext. P. = −78——73——69

| | | | Radius of curvature | Axial distance | | Refractive index (Nd) | | Abbe number ($\nu$d) |
|---|---|---|---|---|---|---|---|---|
| III | G10 | r16 | −58.83 | d15 | 4.80 | N10 | 1.7847 | $\nu$10 25.8 |
| | | | | d16 | 2.90 | | | |
| | G11 | r17 | −25.61 | d17 | 2.10 | N11 | 1.8500 | $\nu$11 40.0 |
| | | r18 | −98.07 | | | | | |
| | | | | d18 | 7.80 | | | |
| | G12 | r19 | −26.37 | d19 | 6.20 | N12 | 1.7495 | $\nu$12 50.0 |
| | | r20 | −23.01 | | | | | |
| | | | | d20 | 19.05—10.66—4.07 | | | |
| | G | r21 | ∞ | d21 | 3.00 | N13 | 1.5168 | $\nu$13 64.2 |
| | | r22 | ∞ | | | | | |

$\infty TL_L/f_L = 0.73$     $f_L/f_I = 2.64$
$f_L/|fm| = 4.60$     $D_m/f_L = 0.34$ As described above, the zoom lens system of the present invention has its aberrations corrected satisfactorily and is nevertheless very short in its overall length and compact. Since the pupil position on the reduction side is relatively remote from the image surface on the reduction side, the zoom lens system permits use of a small-sized illumination system for projectors. The lens system can be zoomed with diminished alterations in the pupil position on the reduction side, so that the zoom lens system is adapted for use with illumination systems wherein the light converging position or the f-number of the condenser lens is fixed. Thus, the present zoom lens system has outstanding advantages.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A zoom lens system comprising, from an enlargement side:
   a first lens unit of a positive power;
   a second lens unit of a positive power, and
   a third lens unit of a negative power, the first and third lens units monotonously move toward a reduction side during a zooming operation from the longest focal length condition to the shortest focal condition, while the second lens unit, which is closest to the third lens unit at the longest focal condition, moves so as to be most proximate to the first lens unit at the shortest focal length condition, wherein the zoom lens system fulfills the following condition, $$3 \leq f_L/|f_{III}| \leq 6$$

wherein $f_L$ is the focal length of the zoom lens system at the longest focal length condition, and $f_{III}$ is the focal length of the third lens unit.

2. A zoom lens system as claimed in claim 1, wherein zoom lens system fulfills the following condition, $$2 \leq f_L/f_I \leq 5$$

wherein $f_I$ is the focal length of the first lens unit.

3. A zoom lens system as claimed in claim 1, wherein the third lens unit includes a positive meniscus lens element having a concave surface faced to the enlargement side at a portion thereof most proximate to the reduction side.

4. A zoom lens system as claimed in claim 1, wherein the third lens unit fulfills the following condition, $$0.2 < D_m/f_L$$

wherein $f_L$ is the focal length of the zoom lens system at the longest focal length condition, and $D_m$ is the thickness of the third lens unit.

5. A zoom lens system comprising, from an enlargement side,
   a first lens unit of a positive power,
   a second lens unit of a positive power and
   a third lens unit of a negative power,
   wherein the first and third lens units monotonously move toward a reduction side during a zooming operation from the longest focal length condition to the shortest focal length condition, while the second lens unit which is closest to the third lens unit at the longest focal condition moves so as to be most proximate to the first lens unit at the shortest focal length condition,
   the zoom lens system fulfilling the following conditions, $$3 \leq f_L/|f_{III}| \leq 6$$

$$2 \leq f_L/f_I \leq 5$$

wherein $f_L$ is the focal length of the zoom lens system at the longest focal length condition, $f_{III}$ is the focal length of the third lens unit, and $f_I$ is the focal length of the first lens unit.

6. A zoom lens system as claimed in claim 5, wherein the third lens unit includes a positive meniscus lens element having a concave surface faced to the enlargement side at a portion thereof most proximate to the reduction side.

7. A zoom lens system as claimed in claim 5, wherein the third lens unit fulfills the following condition, $$0.2 < D_m/f_L$$

wherein $f_L$ is the focal length of the zoom lens system at the longest focal length condition, and $D_m$ is the thickness of the third lens unit.

8. A zoom lens system as claimed in claim 5 further comprising an aperture stop positioned in the vicinity of the first lens unit.

9. A zoom lens system comprising, from an enlargement side:
   an aperture stop fixedly positioned;
   a first lens unit of a positive power,
   a second lens unit of a positive power, and
   a third lens unit of a negative power, wherein the first and third lens units monotonously move toward a reduction side during a zooming operation from the longest focal length condition to the shortest focal length condition, while the second lens unit, which is closest to the third lens unit at the longest focal condition, moves so as to be most proximate to the first lens unit at the shortest focal length condition.

* * * * *